Jan. 31, 1961　　　A. RATNER ET AL　　　2,970,004
SEMI-TRAILER BODY WITH FLOOR PLATE FIFTH WHEEL UNIT
Filed Nov. 13, 1956　　　　　　　　　　　2 Sheets-Sheet 1
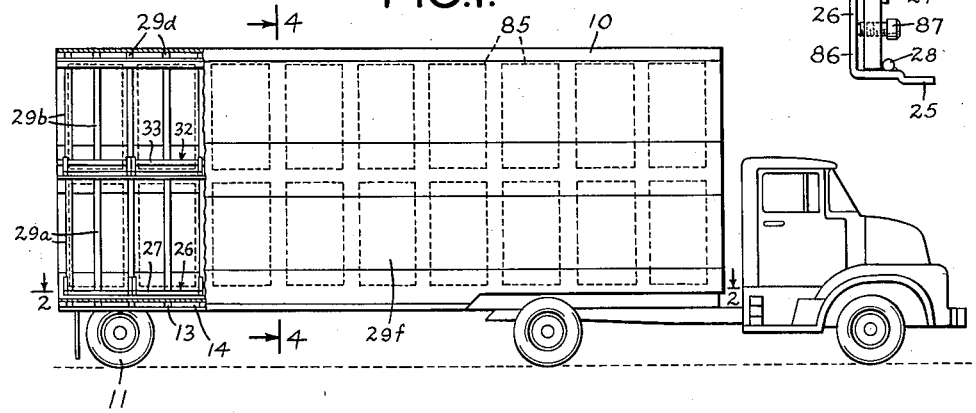
FIG.1.
FIG.8.
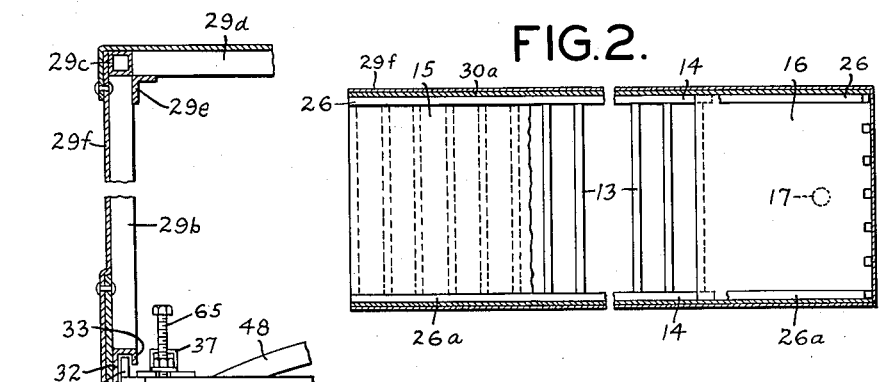
FIG.2.
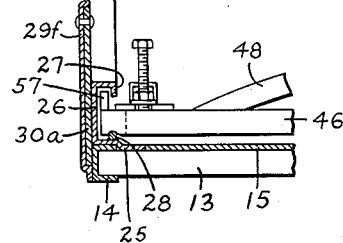
FIG.4A.
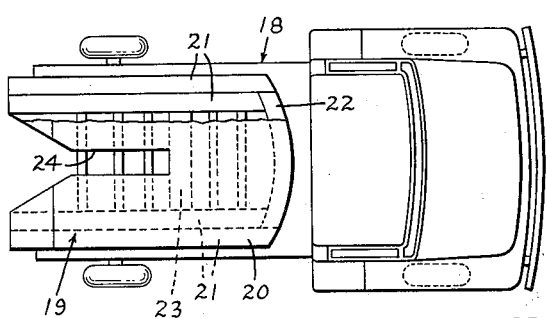
FIG.3.
INVENTORS
ARTHUR RATNER
MARVIN RATNER
BY
Campbell, Brumbaugh, Free & Graves
THEIR ATTORNEYS Jan. 31, 1961 A. RATNER ET AL 2,970,004
SEMI-TRAILER BODY WITH FLOOR PLATE FIFTH WHEEL UNIT
Filed Nov. 13, 1956 2 Sheets-Sheet 2
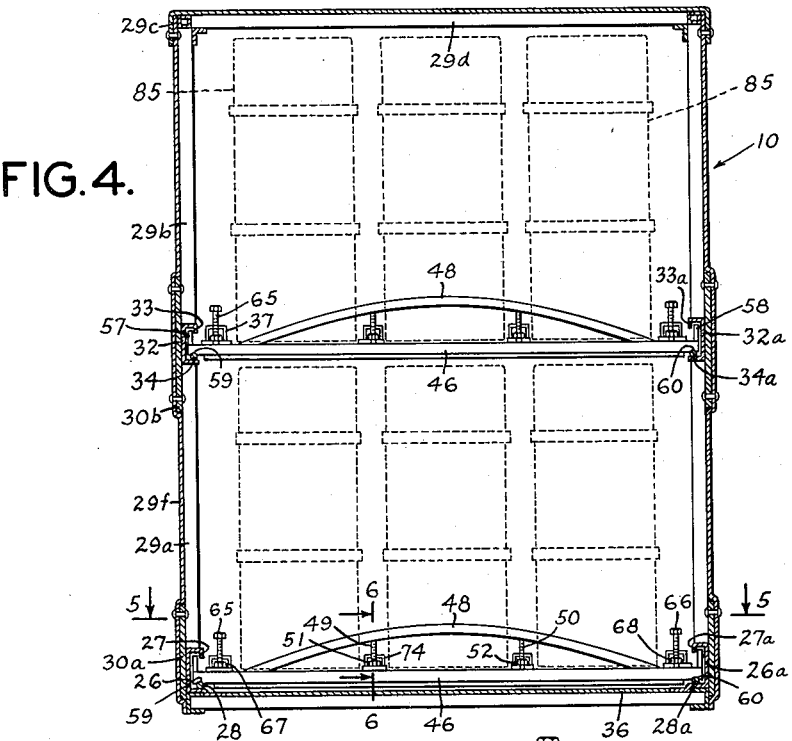
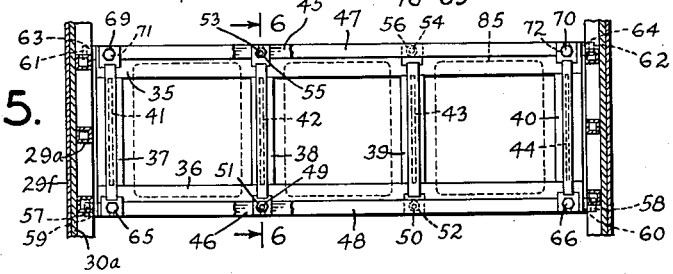
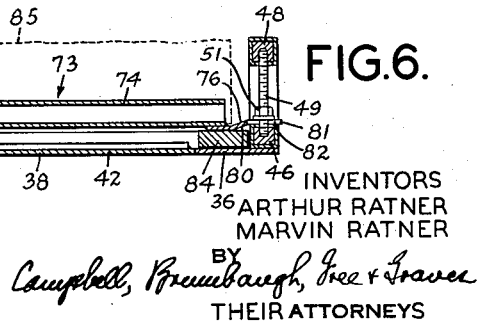
INVENTORS
ARTHUR RATNER
MARVIN RATNER
BY
THEIR ATTORNEYS

2,970,004
SEMI-TRAILER BODY WITH FLOOR PLATE FIFTH WHEEL UNIT

Arthur Ratner, 559 Greene Place, and Marvin Ratner, 585 Barnard Ave., both of Woodmere, N.Y.

Filed Nov. 13, 1956, Ser. No. 621,688

6 Claims. (Cl. 296—28)

The present invention relates to methods and equipment for handling goods and more particularly to new and improved methods and means for transporting goods from a point of origin such as a factory, for example, to a distribution center or to ultimate consumers.

In recent years, well established procedures have been developed for the distribution of hard goods such as electric refrigerators and other appliances. Usually, such goods are packed in cartons or crated to protect them from damage in handling or shipment. Then they are shipped via truck or rail to central distribution points where they are unloaded and stored, pending shipment to the ultimate consumer. As needed, they are taken out of storage, loaded on trucks and delivered to their final destinations. While these procedures are effective, they leave a good deal to be desired, since they involve time-consuming and expensive handling operations.

It is an object of the invention, accordingly, to provide new and improved methods and equipment for handling goods which are free from the above-noted deficiencies of the art.

Another object of the invention is to provide new and improved goods handling methods and apparatus which enable the shipper to dispense with the packing or crating of the goods previously required to insure safety in shipment.

A further object of the invention is to provide new and improved goods handling methods and apparatus enabling groups of like hard goods to be shipped as a unit from the point of manufacture to the ultimate consumer, if desired, without the necessity for unloading and reloading at a local distribution station.

Still another object of the invention is to provide a shipping vehicle which affords the maximum in usable space within the limits of the outside dimensions prescribed by the various regulatory authorities.

These and other objects of the invention are attained by securing a plurality of the goods to pallets and supporting groups of the pallets inside a vehicle for transportation thereby to a selected destination. Preferably, the vehicle is an automobile trailer which can be unhitched from its motive means at destination and parked without removing the contents until needed. Delivery of goods to the ultimate consumers may be effected by hitching motive means to the trailer and dropping off units of the goods at the homes of customers along a given route served by the local distribution center.

Preferably, the goods are mounted on skids, or the like, and a number of units of the goods are adapted to be clamped to a pallet by such skids. The pallets are of a size to be lifted by conventional lift truck means to supports formed in the trailer side walls. The supports are designed to hold the pallets against up and down movement while enabling them to be slid forwardly and rearwardly in inserting and removing them from the trailer. By providing supports at different levels in the trailer, a plurality of groups of pallets can be accommodated in a trailer depending on the dimensions and weight of the goods to be transported.

For a better understanding of the invention, reference is made to the following detailed description of a representative embodiment, taken in conjunction with the accompanying drawings, in which:

Fig. 1 is a side view in elevation of a trailer truck constructed according to the invention;

Fig. 2 is a plan view, partially in section, taken along the line 2—2 of Fig. 1, showing the construction of the trailer floor;

Fig. 3 is a view in plan of a truck to which the trailer of Fig. 1 may be hitched;

Fig. 4 is a sectional view in elevation of the trailer shown in Fig. 1, taken along the line 4—4 and looking in the direction of the arrows, showing a shipment of electric refrigerators mounted on pallets therein;

Fig. 4A is an enlarged view of the left side of the trailer of Fig. 4, showing the side wall construction;

Fig. 5 is a top view, partially in section, taken along the line 5—5 of Fig. 4 of one of the pallets in the trailer of Fig. 1;

Fig. 6 is a partial view in longitudinal section, taken along the line 6—6 of Fig. 5 and looking in the direction of the arrows, of a detail of the mechanism for locking the refrigerators to the pallets;

Figs. 7 and 7A are partial elevation and plan views, respectively, illustrating how the refrigerator skids are locked to the ends of the pallets; and Fig. 8 is a detailed view of the mechanism for locking the pallets in place in the trailer.

While the invention may be utilized advantageously in handling a wide variety of hard goods, it will be described herein for purposes of illustration as adapted for the handling of electric refrigerators of the type intended for home use.

As stated, the novel method and equipment of the invention enables hard goods of this general character to be safely shipped with a minimum of effort and expense and without the necessity for crating or packing in cartons. Shipment of the goods is adapted to be made in a vehicle which preferably is a tractor-trailer of the type shown in Fig. 1. It comprises an elongated body 10 of rectangular cross-section supported in the conventional manner on rear wheels 11.

The tractor-trailer, according to the invention, is a novel design which permits the maximum number of refrigerators to be accommodated within the maximum width, height and length specifications prescribed by regulatory bodies such as the Interstate Commerce Commission. Desirably, therefore, the floor of the trailer should be located as close to the ground as possible, and to this end wheels of smaller size than is usual for equipment of this type are desirable. Also, the springs should preferably be designed for minimum change in deflection between no load and full load conditions.

Referring now to Figs. 1 and 2, the rear portion of the floor of the trailer body 10, up to about the location of the rear wheels of the tractor when hitched to the trailer, is supported by a plurality of longitudinally spaced, horizontal girders 13 secured to side bottom channel members 14, on which is supported the rear floor portion 15 which may be made of plywood or some other suitable material. Secured at the front end of the side bottom channel members 14 is a plate 16 which may be made of ⅜ inch thick steel, for example, and which serves as the floor for say the first 8 feet of the trailer body 10. Mounted beneath the plate 16 is the usual kingpin 17, by means of which the trailer body 10 may be coupled to the trailer truck 18 (Fig. 3). The kingpin 17 is preferably set back about fifty-one inches from the front of the trailer body 10, instead of the usual thirty inches. This allows some telescoping of the tractor and trailer as required to keep the overall length within the I.C.C. regulations.

Support for the forward portion of the trailer body 10 is provided by the so-called "fifth wheel" on the truck 18, which is made considerably larger than usual and of sufficient strength for this purpose. Thus, the "fifth wheel" 19 may be made of steel plate 20 secured to a frame comprising side members 21 formed by securing pairs of I beams back-to-back. The side members 21 are welded or otherwise secured to a curved I beam 22 at the front and to a cross-beam 23 at a location intermediate the ends. The cross-beam 23 is mounted on the tractor chassis for limited rocking movement about a horizontal axis, in the usual manner. Formed in the "fifth wheel" 19 is a longitudinal slot 24 into which the kingpin 17 (Fig. 2) is adapted to be received. In the blind end of the slot 24 is mounted conventional coupling mechanism (not shown) to which the kingpin 17 (Fig. 2) is adapted to be secured.

The left side of the trailer body 10 is formed first by welding to the side channel member 14, to the cross-girders 13, and to the left edge of the plate 16, the bottom inwardly extending flange 25 on a guide member 26 of substantially the same length as the left side of the trailer body. The guide member 26 has an upper inwardly extending retainer flange 27 and a lower longitudinally extending guide rail 28 formed thereon. Welded to the upper surface of the retainer flange 27 are a plurality of short longitudinally spaced apart ribs 29a formed of steel tubing, ending about halfway up the trailer. Also welded over the guide member 26 and to the adjacent parts of the side channel member 14 and of the vertical ribs 29a is a longitudinally extending reenforcing steel plate 30a.

Welded or otherwise secured to the upper ends of the vertical ribs 29a is the lower inwardly extending flange 31 of a guide member 32 having an upper inwardly extending retainer flange 33 and a lower longitudinally extending guide rail 34. Welded to the upper surface of the retainer flange 33 and over the ribs 26 are a plurality of longitudinally spaced vertical ribs 29b extending almost to the top of the trailer. A longitudinally extending reinforcing steel plate 30b of the same length as the trailer is welded to the outside of the guide member 32 and to the adjacent portions of the vertical ribs 29a and 29b.

A longitudinally extending member 29c of steel tubing and of the same length as the trailer is welded to the tops of the vertical ribs 29b. Also, a plurality of longitudinally spaced apart tubular steel cross-members 29d are welded to the member 29c and to a like member forming part of the right side of the trailer body 10, a longitudinally extending angle piece 29e being welded to the vertical ribs 29b and to the cross-members 29d where they meet and form a corner, as shown.

The right side of the trailer body (Fig. 4) is formed in a manner similar to that described above and it includes two longitudinally extending guide members 26a and 32a at the same levels as the guide members 26 and 32, respectively. The guide members 26a and 32a have upper inwardly extending retainer flanges 27a and 33a, respectively, and lower longitudinal guide rails 28a and 34a, respectively.

The front side of the trailer is similarly constructed except that the vertical ribs extend from the floor to the top of the trailer body. Stretched over the frame formed by the members described above is a thin skin 29f of metal, such as aluminum which is secured thereto by rivets 29g.

A typical pallet according to the invention for carrying the goods to be transported is shown in Fig. 5. It comprises spaced flat bottom members 35 and 36 which may be made of steel plate ⅛ inch in thickness, for example, rigidly secured by a plurality of cross-pieces 37, 38, 39 and 40 also made of steel plate. If desirable or necessary, the cross-pieces 37, 38, 39 and 40 may be strengthened by welding or otherwise securing to them steel rods 41, 42, 43 and 44, respectively.

Welded or otherwise secured on the bottom members 35 and 36 are side members 45 and 46 comprising lengths of steel tubing to which are welded or otherwise secured arcuate tubular steel truss members 47 and 48 (Fig. 4).

The truss member 48 is securely linked to the side member 46 by spaced apart steel tie rods 49 and 50 having nuts 51 and 52, respectively, threadedly mounted thereon. Similarly, the truss member 47 is rigidly coupled to the side member 45 by tie rods 53 and 54 which have nuts 55 and 56, respectively, threadedly mounted thereon for a purpose to be described later.

As best shown in Fig. 5, the opposite ends of the side member 46 are provided with upwardly extending portions 57 and 58 which are adapted to cooperate with the inwardly extending retainer portions 27 and 27a or 33 and 33a (Fig. 4) of the guides in the trailer body to confine the pallets to movement forwardly and rearwardly of the trailer. Also, grooves 59 and 60 are formed under the side member 46 at the opposite ends thereof in which the guide rails 28 and 28a or 34 and 34a in the trailer body are adapted to be received.

Similar upwardly extending portions 61 and 62 and grooves 63 and 64 are formed under the side member 45 at the opposite ends thereof and for the same purpose. Also mounted at the opposite ends of the side member 46 are vertical studs 65 and 66 on which are threadedly mounted nuts 67 and 68, respectively, which cooperate in securing the goods to be transported to the pallet as will be described in greater detail below. Similar vertical studs 69 and 70 having nuts 71 and 72, respectively, threadedly mounted thereon are secured at the opposite ends of the side member 45.

The goods to be transported are adapted to be secured to the pallets by a plurality of identical hold-down bars, one of which is shown in some detail in Fig. 6. There the hold-down bar 73 comprises a member 74 which may be made of steel tubing, for example, having welded or otherwise secured at its opposite ends pad members 75 and 76. The pad 75 has an upwardly inclined portion 77 terminating in a flat outer portion 78 having an open-ended slot 79 formed therein in which the tie rod 53 is adapted to be received, as shown in Fig. 6. In similar fashion, the pad 76 has an upwardly inclined portion 80 terminating in an end portion 81 having a slot 82 formed therein in which the tie rod 49 (Figs. 4 and 5) is adapted to be received.

The slots 79 and 82 are made deep enough so that if the bar 73 is moved as far as it can go in the direction of either one of the tie rods 53 and 49, the pad 75 or 76 at the other end will clear the adjacent tie rod so that the bar 73 can be removed.

The electric refrigerators which are to be transported are mounted on skids 83 and 84 usually made of wood (Fig. 6) to which they are rigidly secured in any suitable manner. In the representative embodiment of the invention shown in the figures, each pallet is designed to accommodate three electric refrigerators. In order to enable the refrigerators to be mounted on the pallet, the hold-down bars 73, of which there are four in the form of pallet shown in Fig. 5, are first removed. This is done by loosening the hold-down nuts at the opposite end of each bar and moving the bar as far as it will go towards one of the side members 45 or 46 so that the other end will clear the adjacent bolt. Three electric refrigerators 85, each mounted on skids 83 and 84 are then positioned in adjacent relation on the pallet as shown in Fig. 5. The hold-down bars 73 are then put in place.

Thus, the nuts 51 and 55 (Figs. 4 and 5) are backed off and a hold-down bar 73 is positioned on the side members 45 and 46 with the tie rods 53 and 49 lying in the slots 79 and 82 in the pads 75 and 76, respectively. The nuts 55 and 51, respectively, are then tightened down on the end portions 78 and 81 causing the pad members 75 and 76 to function as leaf springs applying force to the skids 83 and 84.

In similar fashion, a hold-down bar 73 is positioned between the tie rods 50 and 54 and held in place by tightening down the nuts 52 and 56, respectively.

A third hold-down bar 73 is positioned between the rods 66 and 70 and the nuts 68 and 72 are tightened down so that the pads 75 and 76 on the bar 73 clamp the skids 83 and 84 tightly against the bottom of the pallet, as best shown in Figs. 7 and 7A. Lastly, a fourth hold-down bar 73 is positioned between the stud bolts 65 and 69 and is clamped down by tightening the nuts 67 and 71.

The loaded pallet is then moved to the rear of the trailer body 10 by any suitable form of lift truck and lifted to the level of the guides 32 and 32a. When in this position, it is pushed forwardly on the guides 32 and 32a to the front end of the truck. Other pallets similarly loaded are positioned on the guides 32 and 32a and loaded into the truck with the front edge of each pallet engaging the rear edge of the pallet previously loaded in the truck. Loading operations are continued in this manner until the last pallet has been inserted on the guide members 32 and 32a. Then a similar array of pallets is loaded in the truck on the lower guide members 26 and 26a.

In order to prevent movement of the pallets rearwardly of the trailer body, means may be provided for locking them releasably in position. Suitable locking means may comprise, for example, a metal piece 86 (Fig. 8) shaped to fit within the guide 26, for example, and adapted to be locked thereto by means such as a screw 87, operable by an Allen wrench, for example. By tightening the screw 87, the locking piece 86 is urged tightly against the retainer member 27 and the guide rail 28 so that it serves as an effective lock preventing rearward movement of the pallets. Similar locking means may be provided at the rear ends of the guides 26a, 32 and 32a, if desired.

After the trailer body 10 has been loaded as described above, it may be hitched to the truck 18 (Fig. 3) and hauled to a central distribution point or the trailer may be mounted on a railroad flat car and taken to its destination by rail. In either case, upon arrival of the loaded trailer 10 at the local distribution point, it may be parked there until the refrigerators 85 contained therein are needed to fill orders. At such time, the trailer body 10 may again be hitched to a truck 18 and used to make deliveries to various customers along any route served by the local distribution point.

Delivery of a refrigerator is effected by releasing the locking means 86 (Fig. 8) for the pallets, to enable the rearmost pallet in the truck to be lowered to the ground by conventional lifting means (not shown) forming part of the trailer at the rear end thereof. One of the refrigerators 85 can then be removed by loosening the nuts securing the hold-down bars 73 to the pallet. After delivery of the refrigerator has been made, the pallet from which it was removed can be replaced on the guides in the trailer from which it was removed, the locking means of Fig. 8, replaced, and the trailer driven to the next customer.

The invention thus provides novel and effective methods and means for transporting hard goods, such as electric refrigerators and the like, from a point of manufacture, to a destination which may be a warehouse or a local distribution point from which the goods may eventually be transported to an ultimate destination, usually the home of a customer. By securing groups of the goods on pallets and mounting the pallets on guides inside the vehicle, as described above, the goods may be transported safely without the necessity for crating them or packing them in cartons. Further, it is not necessary to unload them from the vehicle upon arrival at the local distribution point, but they may be stored in the vehicle until needed, at which time the vehicle can be used to make deliveries directly to customers along a given route. As a result, the distribution of such goods may be effected with substantial savings in time and cost.

The specific embodiment that has been described above and shown in the drawings is, of course, intended to be merely illustrative and modifications in form and detail may be made within the spirit of the invention. The invention, therefore, is not to be restricted to the specific forms disclosed but encompasses any variation thereof falling within the scope of the appended claims.

We claim:

1. In a trailer body, the combination of a plate member forming the front floor portion of said body, means carried by said plate member for coupling said trailer body to trailer support means on a prime mover for said trailer body, said plate member having sufficient strength to serve as a support for said body and having an under surface of extensive area adapted to bear against said trailer support means when the prime mover is coupled to the trailer body, a rear bottom frame member adjoining said plate member and formed of interconnected longitudinal and lateral girders, said frame member extending forwardly only to the rear edge of said plate member and said plate member rear edge being secured to the front end of said frame member, a rear floor portion supported on said frame member, and upwardly extending side members secured at the forward end and sides of said plate member and at the sides of said frame member.

2. In a trailer body, the combination of a substantially rectangular plate member forming the front floor portion of said body, means carried by said plate member on the under side thereof for coupling said trailer body to trailer support means on a prime mover for said trailer body, said plate member having sufficient strength to serve as a support for said body and having an under surface of extensive area adapted to bear against said trailer support means when the prime mover is coupled to the trailer body, a substantially rectangular rear bottom frame member adjoining said plate member and formed of interconnected longitudinal and lateral girders, said frame member extending forwardly only to the rear edge of said plate member and said plate member rear edge being secured to the front end of said frame member, a rear floor portion supported on said frame member and constituting an extension of said front floor portion, upwardly extending side members secured at the forward end and sides of said plate member and at the sides of said frame member, and wall means secured to said side members.

3. In a vehicle body, a bottom frame comprising interconnected side and transverse girders, a floor on said frame, a side wall frame comprising at least one guide member having an upright base portion extending longitudinally of said vehicle body and upper and lower flanged portions extending longitudinally and inwardly of said vehicle body, the lower flanged portion of said guide member being secured on top of one of said side members, a reinforcing plate member extending longitudinally of said vehicle body and secured to said one side member, to the outer side of said guide member base portion, a plurality of upright rib members spaced apart longitudinally of said vehicle body and each secured at one end to one of said guide member flanged portions and to adjacent portions of said reinforcing plate member, and upwardly extending guide rail means carried by the lower flanged portion of said guide member for supporting an element movably thereon above said floor.

4. In a vehicle body, a side wall comprising spaced apart upper and lower guide members each having an upright base portion extending longitudinally of said vehicle body and upper and lower flanged portions extending longitudinally and inwardly of said vehicle body, spaced apart upper and lower reinforcing plate members extending longitudinally of said vehicle body and secured respectively to the outer sides of said guide member base portions, a first plurality of upright rib members spaced apart longitudinally of the vehicle body and secured to the upper flanged portion of said lower guide member, to the lower flanged portion of said upper guide member, and to portions of said upper and lower reinforcing plate members adjacent said rib members, a second plurality of upright rib members spaced apart longitudinally of said vehicle body and secured at their lower ends to the upper flanged portion of said upper guide member and to portions of said upper reinforcing plate member adjacent thereto, and guide means carried by each of said guide members for supporting an element movably thereon.

5. A side wall for a vehicle body as defined in claim 4 together with a thin skin of covering material secured over the outside of the reinforcing plate members and the rib members.

6. In a vehicle body, a bottom comprising spaced parallel side channel members having a plurality of longitudinally spaced apart cross-girders secured thereto, spaced apart upper and lower guide members each having an upright base portion extending longitudinally of said vehicle body and upper and lower flanged portions extending longitudinally and inwardly of said vehicle body, the lower flanged portion of said lower guide member being secured to one of said side channel members, spaced apart upper and lower reinforcing plate members extending longitudinally of said vehicle body and secured respectively to the outer sides of said guide member base portions, said lower reinforcing plate member also being secured to said one side channel member, a first plurality of upright rib members spaced apart longitudinally of the vehicle body and secured to the upper flanged portion of said lower guide member, to the lower flanged portion of said upper guide member, and to portions of said upper and lower reinforcing plate members adjacent said rib members, a second plurality of upright rib members spaced apart longitudinally of said vehicle body and secured at their lower ends to the upper flanged portion of said upper guide member and to portions of said upper reinforcing plate member adjacent thereto, a thin skin of covering material secured over the outside of the reinforcing plate members and the rib members, and guide means carried by each of said guide members for supporting an element movably thereon.

References Cited in the file of this patent
UNITED STATES PATENTS

| | | |
|---|---|---|
| 1,183,313 | Martin | May 16, 1916 |
| 1,668,530 | Romine | May 1, 1928 |
| 1,882,238 | Brykczynski et al. | Oct. 11, 1932 |
| 2,041,124 | Francis | May 19, 1936 |
| 2,128,708 | Kirk et al. | Aug. 30, 1938 |
| 2,185,961 | Black | Jan. 2, 1940 |
| 2,262,085 | Allen | Nov. 11, 1941 |
| 2,335,516 | Koonce | Nov. 30, 1943 |
| 2,417,640 | Fischbach | Mar. 18, 1947 |
| 2,441,106 | Theriault | May 4, 1948 |
| 2,447,542 | Seward | Aug. 24, 1948 |
| 2,502,703 | Chaplin | Apr. 4, 1950 |
| 2,507,845 | Ziegler | May 16, 1950 |
| 2,565,709 | Watter | Aug. 28, 1951 |
| 2,586,857 | Page | Feb. 26, 1952 |
| 2,678,139 | Gildersleeve | May 11, 1954 |
| 2,846,235 | Currel | Aug. 5, 1958 |
| 2,851,283 | Erickson et al. | Sept. 9, 1958 |